(12) United States Patent
Yamazaki

(10) Patent No.: US 10,508,898 B2
(45) Date of Patent: Dec. 17, 2019

(54) INTERFERENCE MEASUREMENT DEVICE HAVING A VARIABLE PHASE ELEMENT

(71) Applicant: HITACHI, LTD., Tokyo (JP)

(72) Inventor: Kazuyoshi Yamazaki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 22 days.

(21) Appl. No.: 15/467,365

(22) Filed: Mar. 23, 2017

(65) Prior Publication Data

US 2018/0274899 A1 Sep. 27, 2018

(51) Int. Cl.
*G01B 9/02* (2006.01)
*G01B 11/24* (2006.01)

(52) U.S. Cl.
CPC ......... *G01B 9/0201* (2013.01); *G01B 9/0207* (2013.01); *G01B 11/2441* (2013.01)

(58) Field of Classification Search
CPC ............ G01B 11/0675; G01B 11/2441; G01B 2290/45; G01B 2290/70; G01B 9/0201; G01B 9/0207; G01B 9/02027; G01B 9/02081; G01N 21/21
USPC ........................................................ 356/497
See application file for complete search history.

(56) References Cited

U.S. PATENT DOCUMENTS

| 2004/0080754 A1* | 4/2004 | Tobiason | G01B 9/02056 356/495 |
|---|---|---|---|
| 2005/0046865 A1* | 3/2005 | Brock | G01B 9/02057 356/495 |
| 2006/0215171 A1* | 9/2006 | Nakata | G03F 7/70775 356/487 |
| 2010/0309476 A1* | 12/2010 | Millerd | G01B 11/2441 356/495 |
| 2013/0100333 A1* | 4/2013 | Awatsuji | G03H 1/0443 348/335 |

FOREIGN PATENT DOCUMENTS

| JP | 08-189806 A | 7/1996 |
|---|---|---|
| JP | 3621994 B2 | 2/2005 |
| JP | 2005-283683 A | 10/2005 |
| JP | 6289383 B2 | 9/2013 |

* cited by examiner

*Primary Examiner* — Michael P LaPage
(74) *Attorney, Agent, or Firm* — Mattingly & Malur, PC

(57) ABSTRACT

An interference measurement device configured to detect a phase from an interference beam between an object beam and a reference beam, includes: a laser beam source; a splitter configured to split an emitted beam from the laser beam source into the object beam and the reference beam; an object beam optical unit configured to make only the object beam incident on a measurement object; a combination unit configured to combine the object beam and the reference beam; a phase element configured to vary mutual relationship in phase between the object beam and the reference beam; and a detector configured to detect the interference beam between the object beam and the reference beam. A signal of a spatial phase variation of the measurement object is directly operated, based on at least two measurement results of an intensity signal with the detector.

9 Claims, 15 Drawing Sheets

|         | PIXEL 1 | PIXEL 2 | PIXEL 3 | ... | PIXEL n |
|---------|---------|---------|---------|-----|---------|
| FIG. 9A | $\theta(1) - \phi(1)$ | $\theta(2) - \phi(2)$ | $\theta(3) - \phi(3)$ | ••••• | $\theta(n) - \phi(n)$ |
| FIG. 9B | $\theta(1,T_1) - \theta(1,T_2)$ | $\theta(2,T_1) - \theta(2,T_2)$ | $\theta(3,T_1) - \theta(3,T_2)$ | ••••• | $\theta(n,T_1) - \theta(n,T_2)$ |
| FIG. 9C | $\theta(1) = \Delta\theta(1)$ $= \theta(1,T_1) - \theta(1,T_2)$ | $\theta(2) = \theta(1) + \Delta\theta(2)$ $= \{\theta(1,T_1) - \theta(1,T_2)\}$ $+ \{\theta(2,T_1) - \theta(2,T_2)\}$ $= \theta(2,T_1) - \theta(1,T_2)$ | $\theta(3) = \theta(2) + \Delta\theta(3)$ $= \{\theta(2,T_1) - \theta(1,T_2)\}$ $+ \{\theta(3,T_1) - \theta(3,T_2)\}$ $= \theta(3,T_1) - \theta(1,T_2)$ | ••••• | $\theta(n) = \theta(n-1) + \Delta\theta(n)$ $= \{\theta(n-1,T_1) - \theta(1,T_2)\}$ $+ \{\theta(n,T_1) - \theta(n,T_2)\}$ $= \theta(n,T_1) - \theta(1,T_2)$ |

INTERFERENCE MEASUREMENT DEVICE HAVING A VARIABLE PHASE ELEMENT

BACKGROUND

Technical Field

The present invention relates to shape measurement, refractive index measurement, and phase measurement using an interference measurement technique.

Related Art

An interference beam can be considered to be a scale in a wavelength order in light interference measurement so that an object in shape, displacement, speed, refractive index, or phase variation, can be measured with high resolving power and high precision. For example, shape measurement using interference is used for measuring the three-dimensional surface shape, the internal structure, and the thickness of an object. The interference measurement thereof is expected to be applied to quality control of a production line in a factory, but has not been widespread yet due to the following reason.

In interference measurement, a laser beam emitted from the same light source, is typically divided into two being an object beam and a reference beam, and an interference beam between the object beam that have reflected from or passed through a measurement object and the reference beam is measured so that a phase difference between the object beam and the reference beam is measured. In the interference measurement, when disturbance occurs during the measurement, the interference beam becomes unstable so that measurement accuracy degrades. For example, the interference measurement is considerably influenced by a wavefront error (aberration) in an optical system and a temperature gradient in an optical path of the reference beam. In addition, it has been known that the interference measurement is influenced by variability of an optical element, a variation in sensitivity of a detector, dust, or a stain. There is a problem that improvement of robustness is required in order for the interference measurement to prevail considerably, in consideration of the influence.

JP 8-189806 A, JP 5289383 B2, JP 3621994 B2, and JP 2005-283683 A have been proposed in order to solve the problem. JP 8-189806 A describes "to measure a shape other than a plain face and a spherical face with high precision even when aberration is present in an optical system." A solution has been described as follows: "A reference wavefront is generated with a reference plane 6 and a measurement wavefront is generated with reflection on a measurement object 7. An interference pattern is formed on a measurement face of a light intensity detector 8, due to interference between the wavefronts. An interference-pattern analysis unit 9 outputs information on a wavefront shape, based on a signal from the light intensity detector 8. An aberration detection unit 12 detects the aberration in the optical system. A wavefront-shape deformation element 2 in response to the aberration deforms the reference wavefront or the measurement wavefront, or a wavefront-shape adjustment unit 11 corrects the information on the wavefront shape." JP 5289383 B2 describes that "a result is easily acquired in shape measurement that is not influenced by an error of a phase shift occurring when an interferometer optically performs the phase shift with a plurality of polarizers." A solution has been described as follows: "At a device correction step, optical path lengths of an object beam and a reference beam are made constant, and then retaining angles of four units of the polarizers for extracting an interference beam are adjusted in order for four photodetectors to have the same detected intensity in intercepting the object beam and the reference beam (S12). After that, gain for linear correction of the light intensity is set in order to make the amplitude of each time-series variation in intensity of four beams of the interference beams, in agreement, with varying the optical path length of the object beam or the reference beam (S13). Additionally, based on a Lissajous waveform acquired from the time-series variation in intensity of each of the four beams of the interference beam, errors of phase shifts of three non-reference interference beams are calculated (S14). Based on the intensity of the interference beam acquired for a measurement object and the errors of the phase shifts, a phase difference between the object beam of the measurement object and the reference beam is calculated (S17). Furthermore, JP 3621994 B2 describes that "in measurement using a light interferometer, a device that quantitatively evaluates an error given to a measurement value by disturbance and, based on a result thereof, also makes a measurement error an allowable value or less, is provided." A solution has been described as follows: "In an interference optical system, a measurement device for the disturbance that uses a measurement value thereof, gives a phase difference varying in a sawtooth wave pattern between an object beam and a reference beam so as to measure a phase difference using interference beam intensity varying sinusoidally due to the provision. The measurement device samples the phase difference at a certain frequency so that frequency characteristics of an error level given to the measurement value by the disturbance can be evaluated. In addition, an interference beam is divided into two beams of flux, and apertures are provided at different positions of a measurement object to which the beams of flux individually correspond. Then, the phase difference between the beams of the interference which passed through the aperture is measured so that spatial distribution of the error level given to the measurement value by the disturbance can be evaluated. Based on a result, a frequency of the phase difference in the sawtooth wave pattern necessary for achieving measurement accuracy, is determined." JP 2005-283683 A describes that "a digitally holographic device capable of acquiring a reproducing image of an object accompanying a dynamic variation or a reproducing image of an object in real time, and a method of reproducing an image with digital holography are provided." A solution has been described as follows: "The digitally holographic device includes a phase shift array element 2 that converts an incident beam into a reference beam group including a plurality of reference beams each having a different phase value so as to emit the reference beam group. A plurality of interference patterns is generated from one piece of phase distribution data generated by making the reference beam group and an object beam interfere with each other."

SUMMARY

In JP 8-189806 A, when the wavefront error occurs in the optical system, the wavefront-shape deformation element is used to vary the wavefront shape of an object beam so that the wavefront error is corrected. This technique can correct the wavefront error in the entire optical system, whereas there is a problem of influence due to disturbance after the correction, such as a temperature gradient. In JP 5289383 B2, retardation of a wave plate is corrected with gain adjustment. This technique has a feature that the retardation of the wave plate (variability of an optical element) can be corrected, but there is a problem, such as a wavefront error (aberration) in an optical system, a temperature gradient in the optical path of the reference beam, a detector sensitivity error, a wave plate rotation error, dust, or a stain. In JP 3621994 B2, the phase difference varying in the sawtooth pattern is given to the object beam and the reference beam and the sampling is performed several times so that a phase error between the object beam and the reference beam is corrected. This technique can correct the phase error between the object beam and the reference beam, whereas the sampling needs to be performed several times. Thus, there is a problem that the technique is unsuitable to a production line requiring real time. In JP 2005-283683 A, the division phase shift array element is used so that only one detector detects a phase. This technique uses intensity signals of adjacent pixels and operates a phase signal so as to distinctively, barely receive influence due to a variation in sensitivity of the detector, dust, or a stain. On the other hand, a phase difference between an object beam and a reference beam is detected so that influence, such as a wavefront error of an optical system or a temperature gradient in an optical path of the reference beam, is received. In addition, four pixels (intensity) are detected as one pixel (phase) so that degradation of image resolving power of the phase signal is unavoidable. The degradation of the resolving power is a serious problem for use in an inspection device.

Therefore, an object of the present invention is to provide an interference measurement device having high speed, high resolving power, and high robustness.

The invention described in the scope of the claims can achieve the object. As an example, an interference measurement device configured to detect a phase from an interference beam between an object beam and a reference beam, includes: a laser beam source; a splitter configured to split an emitted beam from the laser beam source into the object beam and the reference beam; an object beam optical unit configured to make only the object beam incident on a measurement object; a combination unit configured to combine the object beam and the reference beam; a phase element configured to vary mutual relationship in phase between the object beam and the reference beam; and a detector configured to detect the interference beam between the object beam and the reference beam. A signal of a spatial phase variation of the measurement object is directly operated, based on at least two measurement results of an intensity signal with the detector. Thus, the object of the present invention can be achieved.

According to an embodiment of the present invention, an interference measurement device having high speed, high resolving power, and high robustness, can be provided.

BRIEF DESCRIPTION OF DRAWINGS

FIGS. 9A to 9C are diagrams for describing a phase restoring method of an object beam according to a second embodiment;

DETAILED DESCRIPTION

First Embodiment

Figure 1:
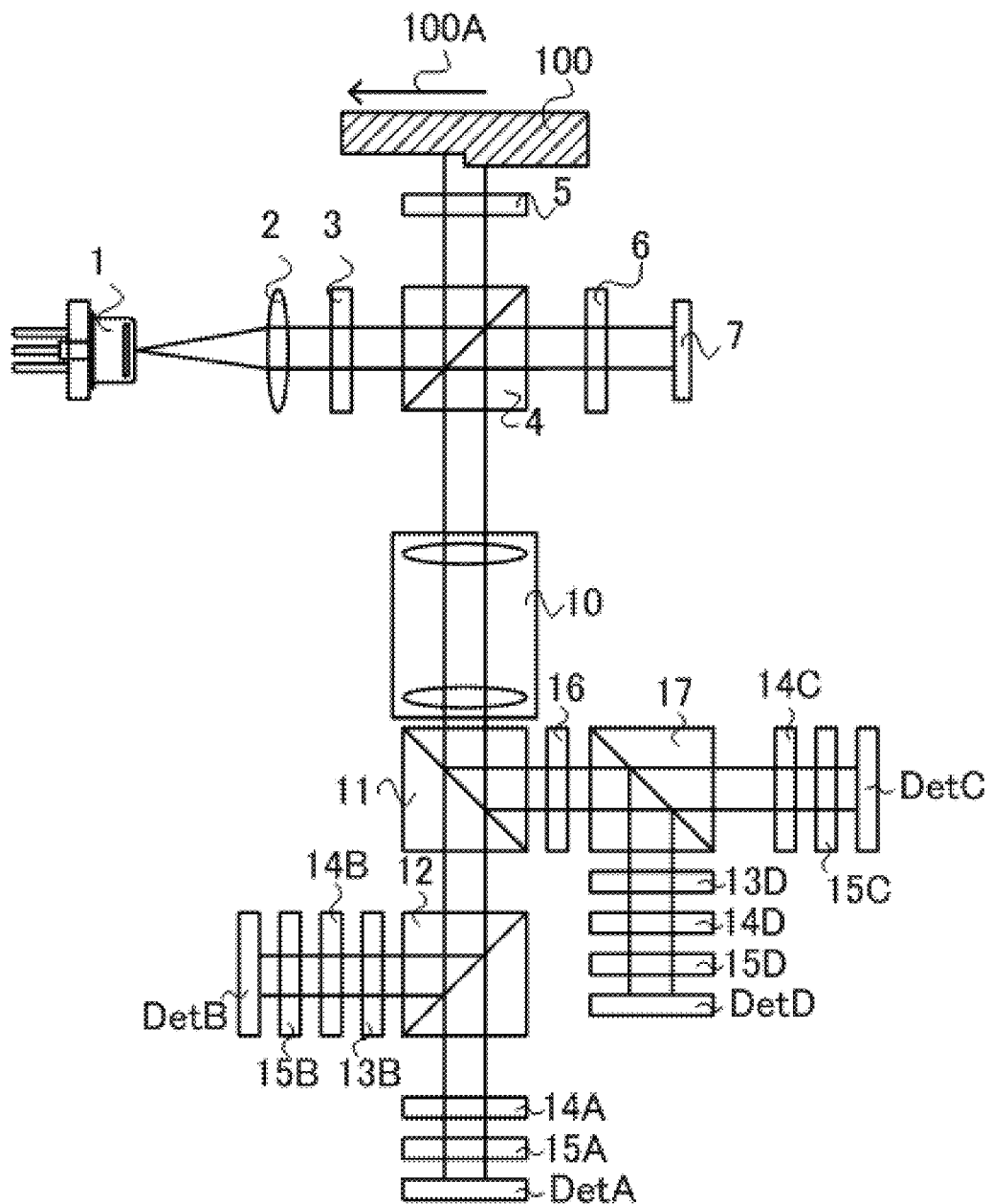
FIG. 1 is a view of an optical system of an interference measurement device according to a first embodiment.

FIG. 1 is a view of an optical system configuration of an interference measurement device according to a first embodiment of the present invention. A phase measurement method according to the present embodiment will be described with FIG. 1.

A light beam emitted from a light source 1 passes through a collimator lens 2 and then is converted so as to have a desired beam diameter. After that, the light beam travels through a half wave plate 3 (hereinafter, referred to as a HWP) so as to be converted into polarization including a polarization component in a horizontal direction and a polarization component in a vertical direction by the HWP 3. The light beam that has passed through the HWP 3 is incident on a polarization beam splitter 4 (hereinafter, referred to as a PBS) so that the polarization component in the horizontal direction passes therethrough and the polarization component in the vertical direction reflects therefrom. Here, the light beam that has reflected from the PBS 4 is referred to as an object beam and the light beam that has passed through the PBS 4 is referred to as a reference beam. The object beam that has reflected from the PBS 4 passes through a quarter wave plate 5 (hereinafter, referred to as a QWP) so as to be incident on a measurement object 100. Then, the light beam that has reflected from the measurement object 100 is incident on the PBS 4 again through the QWP 5.

Meanwhile, the reference beam that has passed through the PBS 4 is incident on the PBS 4 again through a QWP 6 and a mirror 7. The object beam and the reference beam that have been incident on the PBS 4 are combined again so as to be incident on a relay lens 10. The relay lens 10 is arranged so as to form an image of the measurement object 100 on detectors DetA, DetB, DetC, and DetD. The object beam and the reference beam that have passed through the relay lens 10 are incident on a half beam splitter 11 (hereinafter, referred to as an HBS) so that half of the light quantity passes therethrough and the remaining half reflects therefrom. The object beam and the reference beam that have passed, further separate through an HBS 12. Then, the object beam and the reference beam that have passed through the HBS 12 are detected by the detector DetA through an HWP 14A and a polarizer 15A. Note that, the polarizer 15A is an optical element that allows only a predetermined polarization component to pass. Then, the object beam and the reference beam that have reflected from the HWP 12 are incident on the detector DetB through a QWP 13B, an HWP 14B, and a polarizer 15B.

In addition, the object beam and the reference beam that have reflected from the HBS 11 are incident on an HBS 17 through a variable phase retarder 16. The variable phase retarder 16 is capable of adding a predetermined phase to the reference beam. The variable phase retarder 16 is, for example, a liquid crystal element. The object beam and the reference beam that have passed through the HBS 17 are incident on the detector DetC through an HWP 14C and a polarizer 15C. The object beam and the reference beam that have reflected from the HWS 17 are incident on the detector DetD through a QWP 13D, an HWP 14D, and a polarizer 15D. In this case, sensors of the detectors DetA, DetB, DetC, and DetD each detect an interference beam between the object beam and the reference beam, in response to the phase of the measurement object, and the HWP 14A, HWP 14B, HWP 14C, HWP 14D, QWP 13B, QWP 13D, and the variable phase retarder 16.

Next, a signal detection method will be described with a Jones matrix. First, the electric field of the object beam that has passed through the measurement object, the QWP 5, and the PBS 4 is expressed by the following mathematical formula.

$$E_O(x, y, t) = \begin{pmatrix} A(x, y)\exp\{i\theta(x, y, t)\} \\ 0 \end{pmatrix} \quad \text{[Mathematical Formula 1]}$$

where $A(x,y)$ and $\theta(x,y,t)$ represent the amplitude and the phase of the object beam, respectively. The amplitude of the object beam $A(x,y)$ is assumed to be constant in terms of time. In practice, the amplitude of the object beam varies in terms of time in accordance with a variation of the transmissivity of the measurement object, but here the variation is assumed to be small in order to simplify the descriptions. In practice, even when the intensity varies, no error occurs in a phase to be detected.

The electric field of the reference beam $E_R(x,y)$ that has reflected from the PBS 4 is expressed by the following mathematical formula.

$$E_R(x, y) = \begin{pmatrix} 0 \\ B(x, y)\exp\{i\phi(x, y)\} \end{pmatrix} \quad \text{[Mathematical Formula 2]}$$

where $B(x,y)$ and $\phi(x,y)$ represent the amplitude and phase of the reference beam, respectively. Here, only the measurement object moves so that the reference beam remains constant in terms of time. The electric field of the object beam and the reference beam $E_{PA}(x,y,t)$ that have been emitted from the PBS 4 can be expressed by the following mathematical formula with Mathematical Formula 1 and Mathematical Formula 2.

$$E_{PA}(x, y, t) = \quad \text{[Mathematical Formula 3]}$$

$$\begin{pmatrix} 1 & 0 \\ 0 & 0 \end{pmatrix} E_O(x, y, t) + \begin{pmatrix} 0 & 0 \\ 0 & 1 \end{pmatrix} E_R(x, y, t) = \begin{pmatrix} A(x, y)\exp\{i\theta(x, y, t)\} \\ B(x, y)\exp\{i\phi(x, y)\} \end{pmatrix}$$

Here, the electric field of an interference beam $E_A(x,y,t)$ on the detector DetA is expressed by the following mathematical formula with Mathematical Formula 3, an HWP operator, and a polarizer operator.

$$E_A(x, y, t) = \frac{1}{2\sqrt{2}} \begin{pmatrix} 1 & 0 \\ 0 & 0 \end{pmatrix} \begin{pmatrix} 1 & 1 \\ 1 & -1 \end{pmatrix} \begin{pmatrix} 1 & 0 \\ 0 & 1 \end{pmatrix} \begin{pmatrix} 1 & 0 \\ 0 & 1 \end{pmatrix} \begin{pmatrix} A(x, y)\exp\{i\theta(x, y, t)\} \\ B(x, y)\exp\{i\phi(x, y)\} \end{pmatrix} \quad \text{[Mathematical Formula 4]}$$

$$= \frac{1}{2\sqrt{2}} \begin{pmatrix} A(x, y)\exp\{i(\theta(x, y, t))\} + B(x, y)\exp\{i(\phi(x, y))\} \\ 0 \end{pmatrix}$$

The light intensity of the interference beam between the object beam and the reference beam $I_A(x,y,t)$ detected by the detector DetA can be expressed by the following mathematical formula with the amplitudes $A(x,y)$ and $B(x,y)$, the phases $\theta(x,y,t)$ and $\phi(x,y)$.

$$I_A(x, y, t) = \frac{1}{8} \quad \text{[Mathematical Formula 5]}$$

$$|A(x, y)\exp\{i\theta(x, y, t)\} + B(x, y)\exp\{i\phi(x, y)\}|^2$$

$$= \frac{1}{8}[A(x, y)^2 + B(x, y)^2 + 2A(x, y)B(x, y)\cos\{\theta(x, y, t) - \phi(x, y)\}]$$

Similarly, the light intensities $I_B(x,y,t)$, $I_C(x,y,t)$, and $I_D(x,y,t)$ of the interference beam between the object beam and the reference beam on the detectors DetB, DetC, and DetD, are expressed by the following mathematical formulas.

$$I_B(x, y, t) = \frac{1}{8}[A(x, y)^2 + B(x, y)^2 - \quad \text{[Mathematical Formula 6]}$$

$$2A(x, y)B(x, y)\sin\{\theta(x, y, t) = \phi(x, y)\}]$$

$$I_C(x, y, t) = \frac{1}{8}[A(x, y)^2 + B(x, y)^2 +$$

$$2A(x, y)B(x, y)\cos$$

$$\{\theta(x, y, t) - \phi(x, y) - \Delta\phi(x, y)\}]$$

$$I_D(x, y, t) = \frac{1}{8}[A(x, y)^2 + B(x, y)^2 -$$

$$2A(x, y)B(x, y)\sin$$

$$\{\theta(x, y, t) - \phi(x, y) - \Delta\phi(x, y)\}]$$

where $\Delta\phi(x,y)$ represents the added phase level of the variable phase retarder 16. Here, the added phase level $\Delta\phi(x,y)$ is defined to be 0 deg at time $T_1$, and the added phase level $\Delta\phi(x,y)$ is defined to be 180 deg at time $T_2$. Then, a differential signal between signals detected by the same detector at different time, is operated. The following operation is performed.

$$I_A(x, y, T_1) - I_A(x, y, T_2) = -\frac{A(x, y)B(x, y)}{2}$$
$$\sin\left\{\frac{\theta(x, y, T_1) + \theta(x, y, T_2)}{2} - \phi(x, y)\right\}$$
$$\sin\left\{\frac{\theta(x, y, T_1) - \theta(x, y, T_2)}{2}\right\}$$

$$I_B(x, y, T_1) - I_B(x, y, T_2) = -\frac{A(x, y)B(x, y)}{2}$$
$$\cos\left\{\frac{\theta(x, y, T_1) + \theta(x, y, T_2)}{2} - \phi(x, y)\right\}$$
$$\sin\left\{\frac{\theta(x, y, T_1) - \theta(x, y, T_2)}{2}\right\}$$

$$I_C(x, y, T_1) - I_C(x, y, T_2) = -\frac{A(x, y)B(x, y)}{2}$$
$$\cos\left\{\frac{\theta(x, y, T_1) + \theta(x, y, T_2)}{2} - \phi(x, y)\right\}$$
$$\cos\left\{\frac{\theta(x, y, T_1) - \theta(x, y, T_2)}{2}\right\}$$

$$I_D(x, y, T_1) - I_D(x, y, T_2) = -\frac{A(x, y)B(x, y)}{2}$$
$$\sin\left\{\frac{\theta(x, y, T_1) + \theta(x, y, T_2)}{2} - \phi(x, y)\right\}$$
$$\cos\left\{\frac{\theta(x, y, T_1) - \theta(x, y, T_2)}{2}\right\}$$

[Mathematical Formula 7]

Next, the following operation is performed.

$$\{I_A(x, y, T_1) - I_A(x, y, T_2)\}^2 +$$
$$\{I_B(x, y, T_1) - I_B(x, y, T_2)\}^2 =$$
$$\frac{\{A(x, y)B(x, y)\}^2}{2}\sin^2\left\{\frac{\Delta\theta(x, y, T_1)}{2}\right\}$$
$$\{I_C(x, y, T_1) - I_C(x, y, T_2)\}^2 +$$
$$\{I_D(x, y, T_1) - I_D(x, y, T_2)\}^2 =$$
$$\frac{\{A(x, y)B(x, y)\}^2}{2}\cos^2\left\{\frac{\Delta\theta(x, y, T_1)}{2}\right\}$$
$$\theta(x, y, T_1) - \theta(x, y, T_2) = \Delta\theta(x, y, T_1)$$

[Mathematical Formula 8]

where $\Delta\theta(x,y,T_1)$ represents the phase variation of the object beam at time $T_1$ and time $T_2$. In this case, the phase variation level $\Delta\theta(x,y,T_1)$ is expressed by the following mathematical formula.

$$\Delta\theta(x, y, T_1) = 2\tan^{-1}\left[\pm\sqrt{\frac{\{I_A(x, y, T_1) - I_A(x, y, T_2)\}^2 + \{I_B(x, y, T_1) - I_B(x, y, T_2)\}^2}{\{I_C(x, y, T_1) - I_C(x, y, T_2)\}^2 + \{I_D(x, y, T_1) - I_D(x, y, T_2)\}^2}}\right]$$

[Mathematical Formula 9]

Figure 2A:
FIGS. 2A to 2C are graphical representations for describing a detection method of a spatial phase variation according to the first embodiment.
Figure 2B:
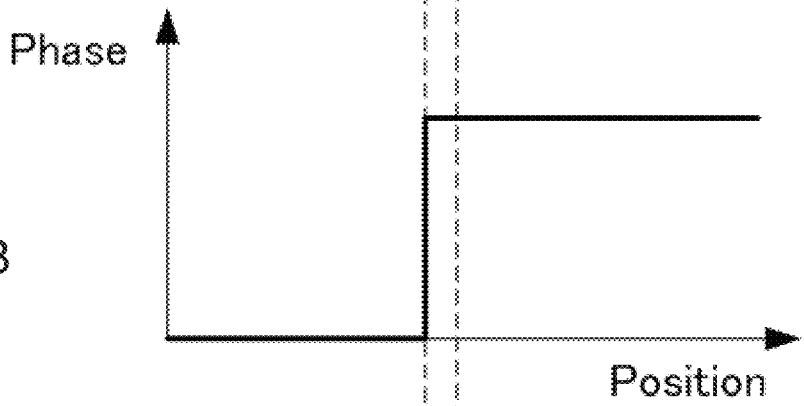
Figure 2C:
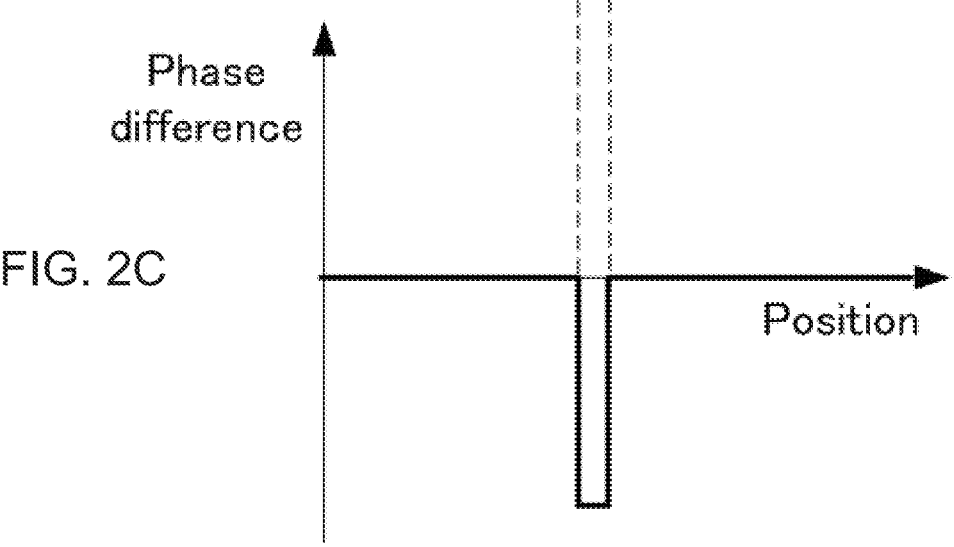

Note that, determination of the positive and the negative of a $\tan^{-1}$ component in Mathematical Formula 9 can be determined with Mathematical Formula 8. FIGS. 2A to 2C illustrate an image of phase detection according to the embodiment of the present invention. FIGS. 2A, 2B, and 2C illustrate the phase of the object beam at time $T_1$, the phase of the object beam at time $T_2$, and the phase variation of the object beam between time $T_1$ and time $T_2$, respectively. In the figures, the vertical axis indicates the phase and the phase difference, and the horizontal axis indicates the position. The measurement object moves in a minus direction from FIG. 2A to FIG. 2B. According to the embodiment of the present invention, the detection of a phase variation in terms of time is distinctive as illustrated in FIG. 2C. Note that, since the measurement object moves, the phase variation in terms of time can be regarded as the spatial phase variation of the measurement object.

The present detection method has two effects. The first effect is that the detection method is independent of the phase of the reference beam. As illustrated in Mathematical Formula 8 and Mathematical Formula 9, the detection method according to the embodiment of the present invention detects only the phase variation of the object beam during a predetermined time. Accordingly, the detection method barely depends on the phase of the reference beam. For example, two times of measurement are performed for a short time so that no influence of a variation having a large time constant, such as a temperature variation in an optical path of the reference beam, is received. Since being independent of the phase of the stationary object beam or reference beam, the detection method receives no influence due to lens aberration, distortion of a mirror or a prism. Therefore, the present detection method needs no wavefront-shape deformation element described in JP 8-189806 A.

The second effect is that high robustness is provided with respect to a detector sensitivity error, a wave plate rotation error, dust, or a stain. The present detection method distinctively performs the differential operation between the signals detected by the same detector as described in Mathematical Formula 7. For example, a phase signal is detected with four intensity signals in a detection method described in JP 5289383 B2, but there is a problem that influence due to a detector sensitivity error, a wave plate rotation error, dust, or a stain, is considerably and easily received. In JP 5289383 B2, similarly to the present embodiment, a differential operation is performed to detection signals so that constant terms ($A(x,y)^2$, $B(x,y)^2$) described in Mathematical Formula 5 and Mathematical Formula 6 are canceled. Note that, in JP 5289383 B2, a differential signal between two different detectors is used so that signal intensity having the constant terms ($A(x,y)^2$, $B(x,y)^2$) of the two detectors different from each other, is acquired when a detector sensitivity error, a wave plate rotation error, dust, or a stain occurs. When the constant terms remain, a component including only the phase cannot be detected so that the phase signal cannot be detected. Furthermore, in JP 5289383 B2, when the light quantity of a reference beam increases with respect to an object beam in order to acquire a signal amplification effect of the object beam, there is a problem that even a sensitivity error of the same detector increases the influence. In contrast, the detection method according to the embodiment of the present invention performs the differential operation to the signals of the same detector so that the constant terms can be canceled even when a detector sensitivity error, a wave plate rotation error, dust, or a stain occurs. For example, two times of measurement are performed with the same sensitivity even when the sensitivity of the detector DetA degrades, so that the constant terms are)) canceled. In this case, A(x,y)B(x,y) of a term including the phase component receives the influence, but the influence is considerably small in comparison to that on the constant terms. In this case, division is made as described in Mathematical Formula 9 so that the signal amplification is completely independent of the influence.

Figure 3A:
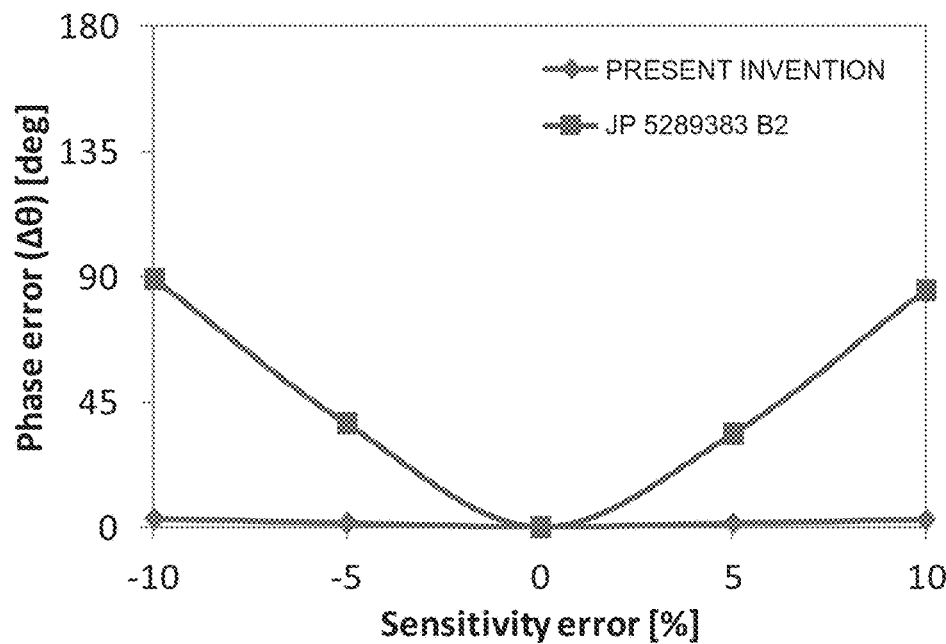
FIGS. 3A and 3B are graphical representations for describing an effect of the invention according to the first embodiment.
Figure 3B:
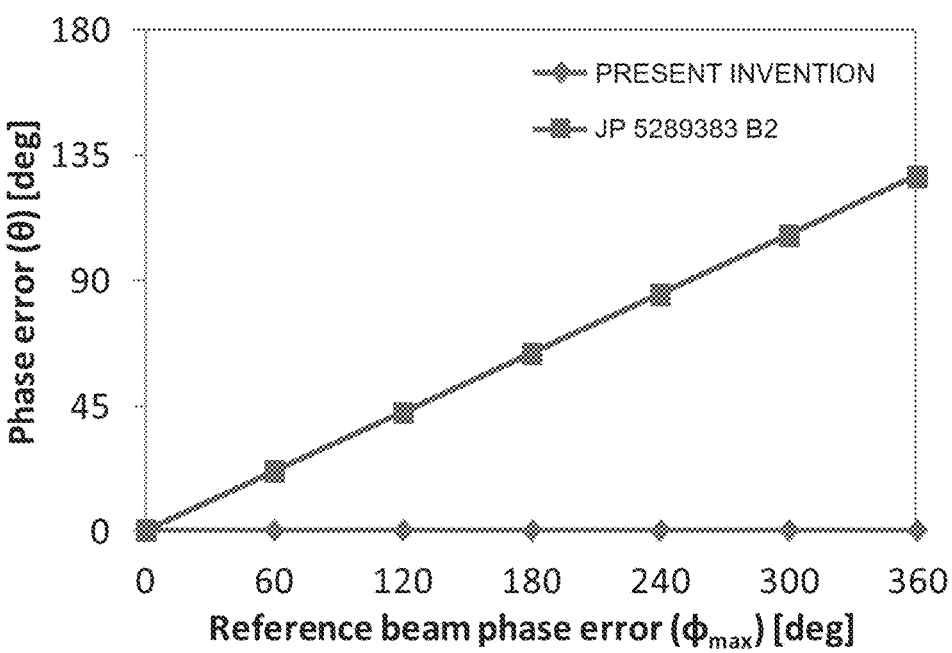

According to the embodiment of the present invention, the phase variation of the object beam is distinctively, directly operated with eight intensity signals detected by the four detectors. For example, the phase variation in terms of time can be operated with the phase signal twice even in JP 5289383 B2, but a phase error considerably larger than that according to the embodiment of the present invention, occurs when a detector sensitivity error, a wave plate rotation error, dust, or a stain occurs. FIGS. 3A and 3B each illustrate a calculation result of the robustness. FIG. 3A illustrates dependency on detector sensitivity error, and FIG. 3B illustrates dependency on reference beam phase error. The present calculation uses the following conditions.

Figure 4A:
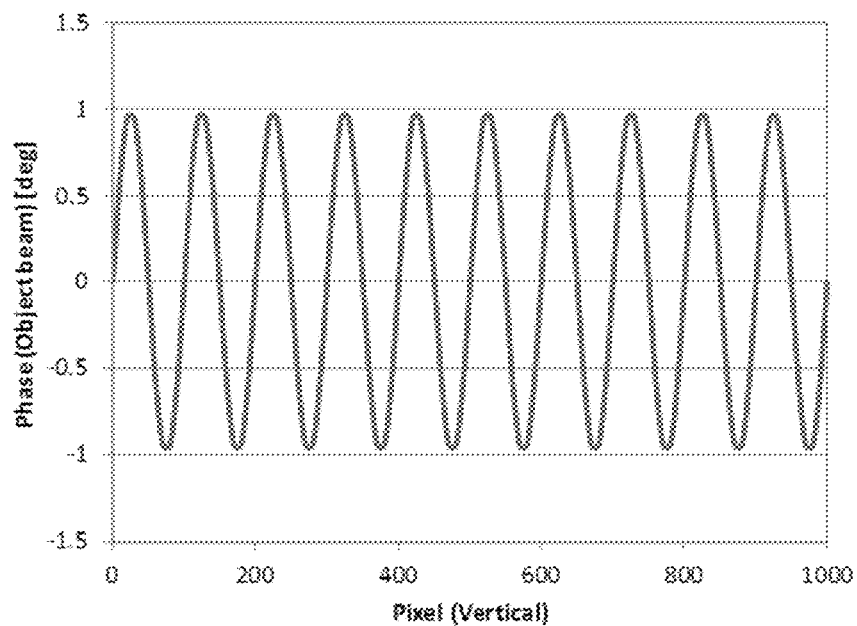
FIGS. 4A and 4B are graphical representations for describing a condition of calculation according to the first embodiment.
Figure 4B:
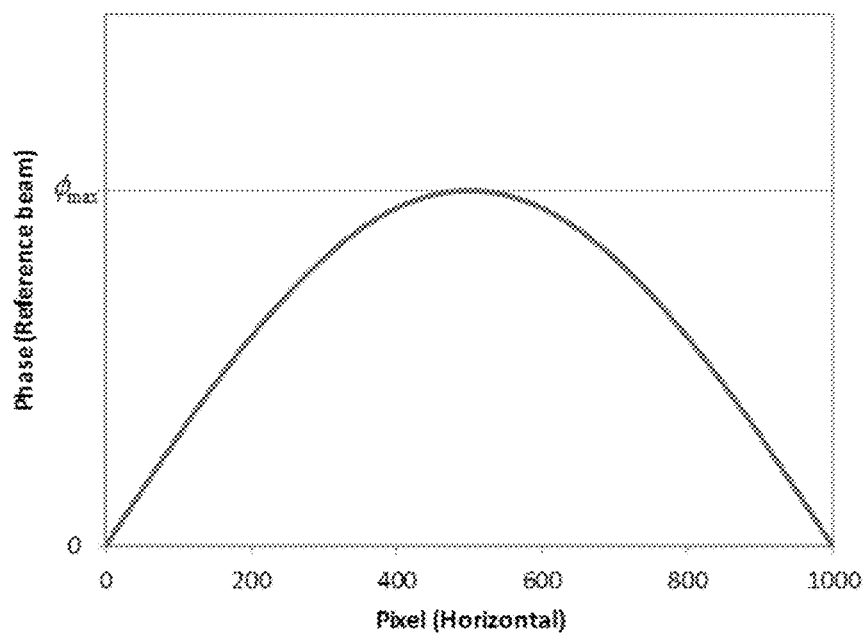

[Dependency on Detector Sensitivity Error]
Object beam phase: FIG. 4A
Reference beam phase: flat, FIG. 4B
Signal amplification factor: 50 times
Time shift amount: 1/18 of a cycle
Pixel count: 1000×1000 pixels
Phase error: average error of all pixels
[Dependency on Reference Beam Phase Error]
Object beam phase: FIG. 4A
Reference beam phase: FIG. 4B
Signal amplification factor: 50 times
Time shift amount: 1/18 of a cycle
Pixel count: 1000×1000 pixels
Phase error: average error of all pixels Note that the phase of the object beam $\theta(x,y,t)$ is a sinusoidal wave. The sinusoidal wave is shifted by 1/18 of a cycle from time $T_1$ to time $T_2$. The dependency on detector sensitivity error illustrates a result of the phase error when the sensitivity of one detector varies. The horizontal axis of the dependency on reference beam phase error corresponds to a peak position in FIG. 4B. The phase of the object beam is considered to be the sinusoidal wave in an x direction and the phase of the reference beam is considered to be a sinusoidal wave in a y direction. The method of detecting the phase difference between the object beam and the reference beam is provided in JP 5289383 B2, whereas, according to the present embodiment, the phase variation is operated during two different time periods.

As illustrated in FIGS. 3A and 3B, the robustness is effective against the detector sensitivity error and the reference beam phase error in comparison to that in JP 5289383 B2. According to the present embodiment, the detector sensitivity error has been described, but the same effect can be acquired even when a wave plate rotation error, dust, or a stain occurs, in terms of signal variation.

Figure 5:
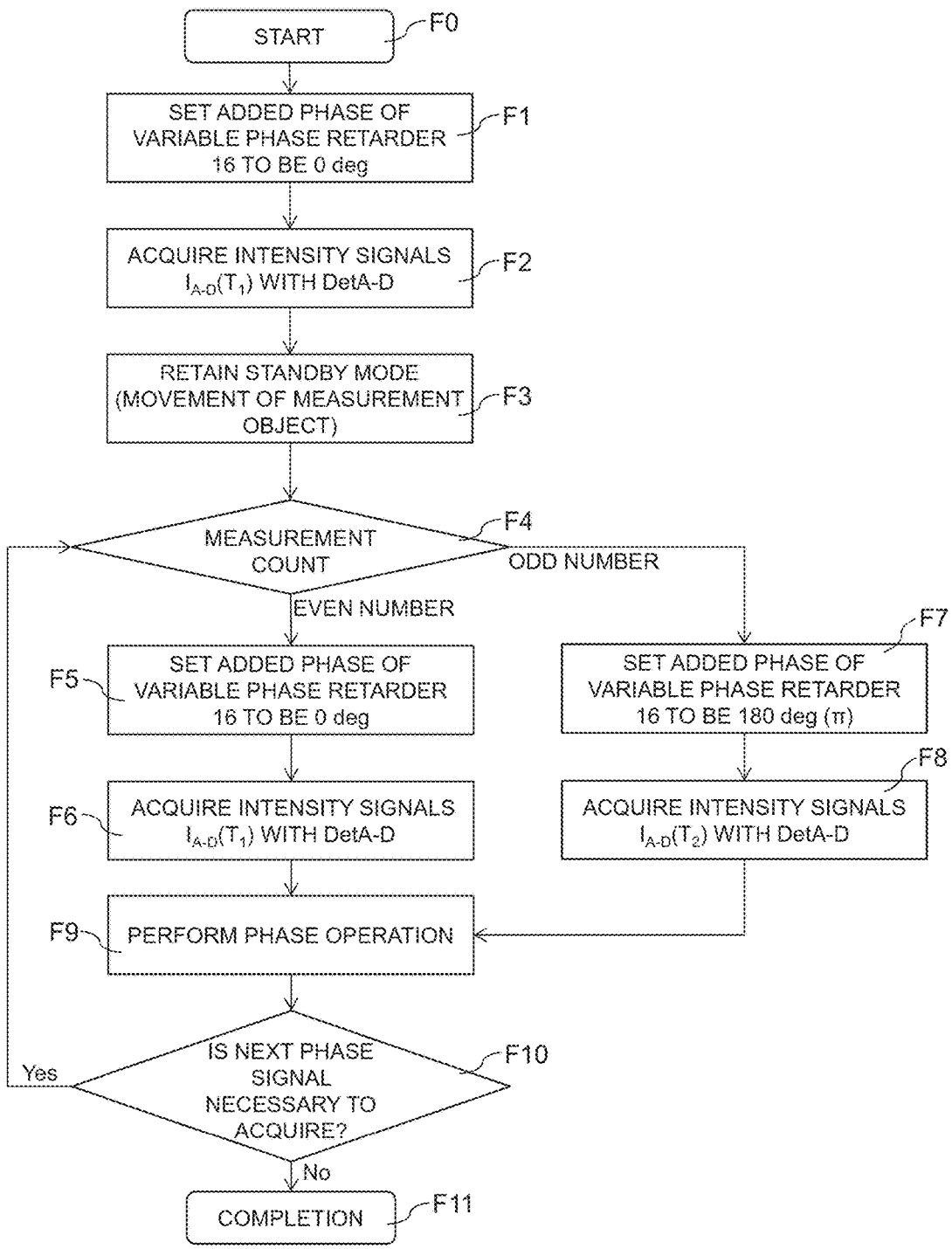
FIG. 5 is a flowchart for describing a measurement processing according to the first embodiment.

FIG. 5 illustrates a detection processing of the present detection method when a phase detection method according to the present embodiment has been applied to quality inspection. The measurement object is assumed to move in the present quality inspection. First, an added phase of the variable phase retarder 16 is selected to be 0 deg (F1) and then the intensity signals of the detectors DetA, DetB, DetC, and DetD are acquired (F2). In this case, the intensity signals of the detectors DetA, DetB, DetC, and DetD are defined to be $I_A(x,y,T_1)$, $I_B(x,y,T_1)$, $I_C(x,y,T_1)$, and $I_D(x,y,T_1)$, respectively. After the acquisition of the intensity signals, a standby mode remains during a predetermined time (F3), and the measurement object moves by a predetermined quantity during the time. Then, the added phase of the variable phase retarder 16 is selected to be 180 deg (F7), and the intensity signals of the detectors DetA, DetB, DetC, and DetD are acquired (F8). In this case, the intensity signals of the detectors DetA, DetB, DetC, and DetD are defined to be $I_A(x,y,T_2)$, $I_B(x,y,T_2)$, $I_C(x,y,T_2)$, and $I_D(x,y,T_2)$ (F8). Next, the phase operation described in Mathematical Formula 9 is performed with the intensity signals that have been acquired (F9). When the next phase signal is necessary to be acquired, the standby mode remains during the predetermined time (F3). When a measurement count is even (F4 EVEN NUMBER), the added phase of the variable phase retarder 16 is selected to be 0 deg (F5) and the intensity signals of the detectors DetA, DetB, DetC, and DetD are acquired (F6). When the measurement count is odd (F4 ODD NUMBER), the added phase of the variable phase retarder 16 is selected to be 180 deg (F7), and the intensity signals of the detectors DetA, DetB, DetC, and DetD are acquired (F8). Then, the phase operation is performed. The flowchart is repeated so that the quality inspection of the measurement object can be performed.

Figure 6:
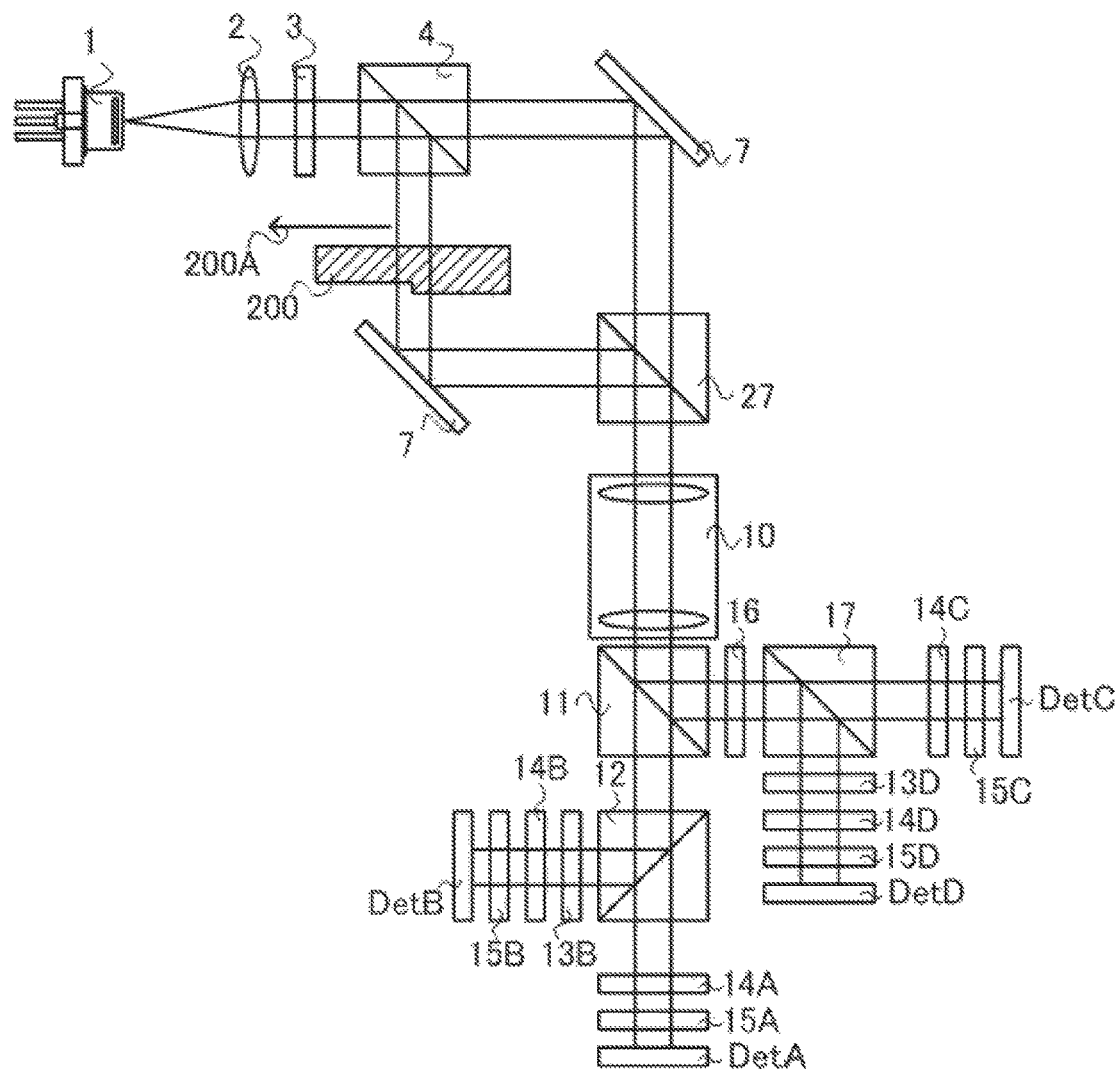
FIG. 6 is a view of a different optical system of the interference measurement device according to the first embodiment.
Figure 7:
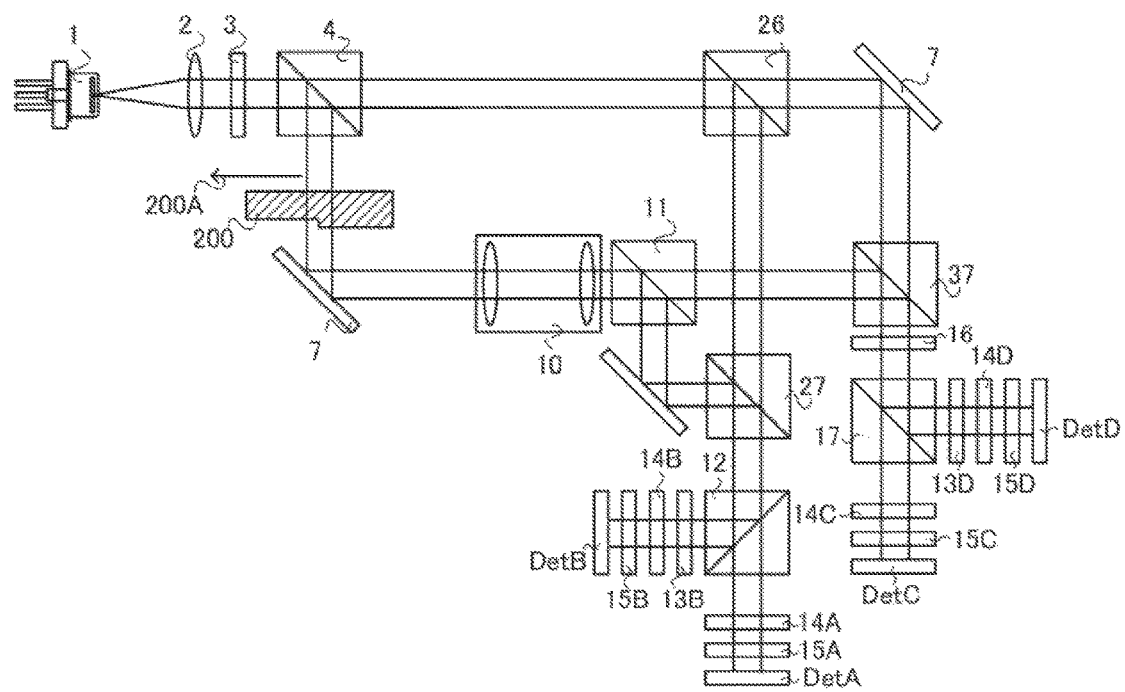
FIG. 7 is a view of a different optical system of the interference measurement device according to the first embodiment.

The optical system configuration, the operation method, and the detection processing are provided so that the phase detection can be achieved, robust to a wavefront error (aberration) of an optical system, a temperature gradient in an optical path of a reference beam, a variation in sensitivity of a detector, a wave plate rotation error, dust, or a stain. Note that, according to the present embodiment, the descriptions have been given with FIG. 1, but optical system configurations illustrated in FIGS. 6 and 7 may be provided. In FIG. 6, a measurement object 200 corresponds to a translucent medium and moves in a moving direction 200A. Here, a PBS 27 is used to combine an object beam and a reference beam. In FIG. 7, an HBS 11 and an HBS 26 previously separate an object beam from a reference beam, and then a PBS 27 and the PBS 37 combine the object beam and the reference beam. According to the embodiment of the present invention, the spatial phase variation of a measurement object is distinctively detected from a plurality of intensity signals each having a different measurement time so that the detection optical system is not limited to these.

Figure 8:
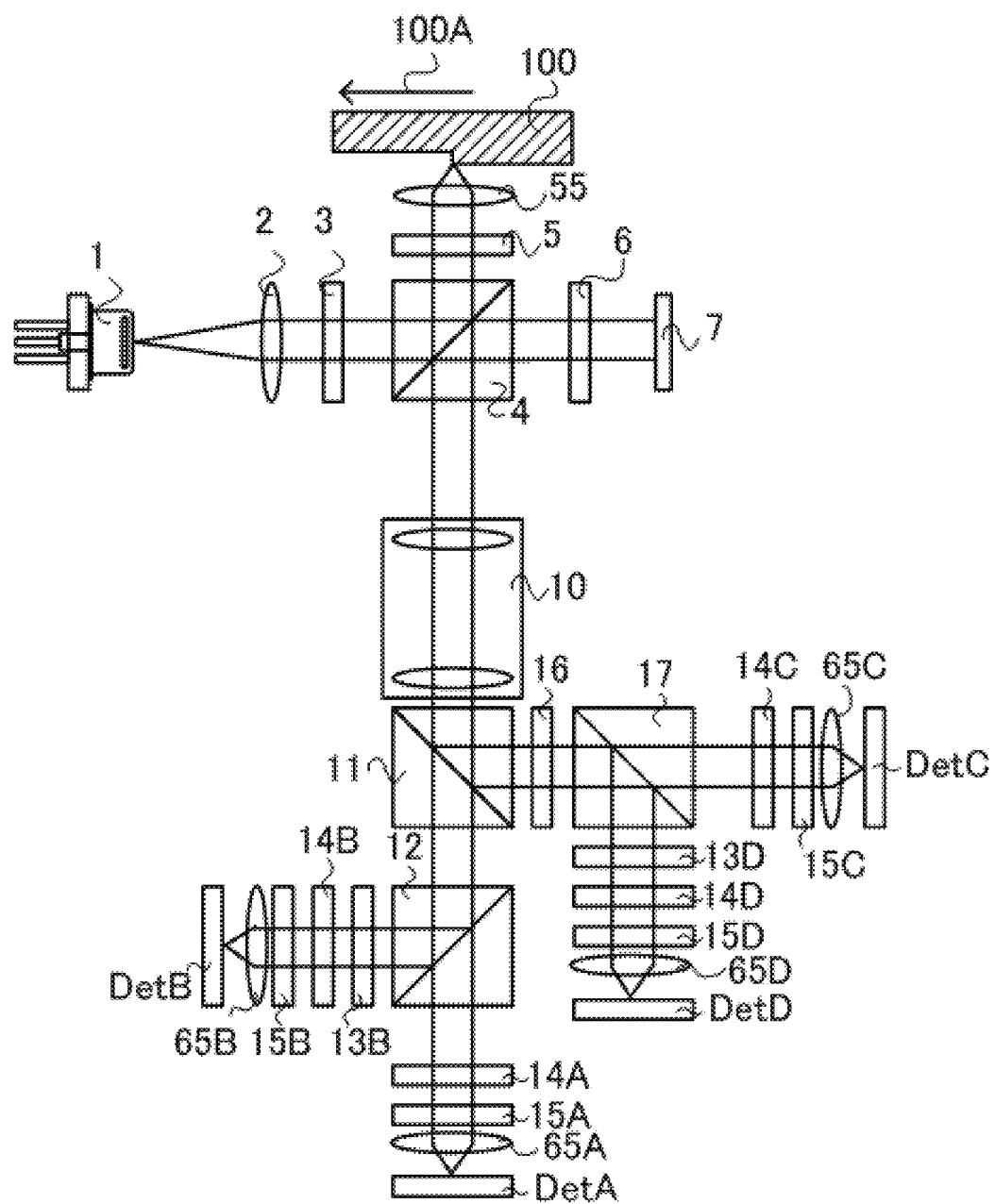
FIG. 8 is a view of a different optical system of the interference measurement device according to the first embodiment.

The detectors DetA, DetB, DetC, and DetD according to the present embodiment each are estimated to be a two-dimensional sensor, such as a camera sensor, but, as illustrated in FIG. 8, the detectors DetA, DetB, DetC, and DetD each may be a one-dimensional line sensor with a cylindrical lens 55, a cylindrical lens 65A, a cylindrical lens 65B, a cylindrical lens 65C, and a cylindrical lens 65D. Typically, a one-dimensional sensor can be driven at speed higher than that of a two-dimensional sensor so that the detection can be performed at higher speed with the configuration. In this case, an incident beam on a measurement object is also one-dimensional so that the utilization efficiency of light can further improve. In FIG. 8, the cylindrical lenses are used so as to be arranged in a line on the measurement object, but a parallel beam may be used. With this configuration, robustness can be made with respect to a positional error in an optical axis.

According to the present embodiment, the measurement object moves, but the optical system may move. The wave plates according to the present embodiment, are arranged to vary mutual phase relationship between the object beam and the reference beam so that a wave plate including an HWP and a QWP combined, may be used. Furthermore, a wave plate, a polarizer, a PBS, and an HBS may be streamlined.

According to the present embodiment, the variable phase retarder 16 shifts the phase between the object beam and the reference beam by n from time $T_1$ to time $T_2$, but is not limited to this, and, for example, the following condition may be provided: $(n+1)\pi$ (n=0, 1, 2 . . . )

Second Embodiment

According to the first embodiment, the spatial phase variation of the measurement object is detected. Using the present method can visualize a phase variation for an ununiform region in a refractive index, a flaw, a stain, a flow in temperature, and a flow in air. Meanwhile, an actual shape (e.g., a step and a curved surface) cannot be directly detected, differently from JP 8-189806 A, JP 5289383 B2, JP 3621994 B2, and JP 2005-283683 A. Therefore, according to the present embodiment, a method of restoring a phase image similar to a conventional phase image, will be described.

FIGS. 9A to 9C illustrates the phase storing method according to the second embodiment. Note that, an optical system configuration is similar to that according to the first embodiment. FIGS. 9A to 9C each illustrate a phase detection result when detectors DetA, DetB, DetC, and DetD are a camera sensor. FIGS. 9A, 9B, and 9C illustrate a phase of phase detection according to JP 8-189806 A, JP 5289383 B2, JP 3621994 B2, and JP 2005-283683 A (hereinafter, referred to as a conventional method), a phase (a spatial phase variation) according to the present embodiment, and phase restoration according to the present embodiment, respectively. Note that, the descriptions are given, based on a one-dimensional direction, so as to be simplified.

Figure 10A:
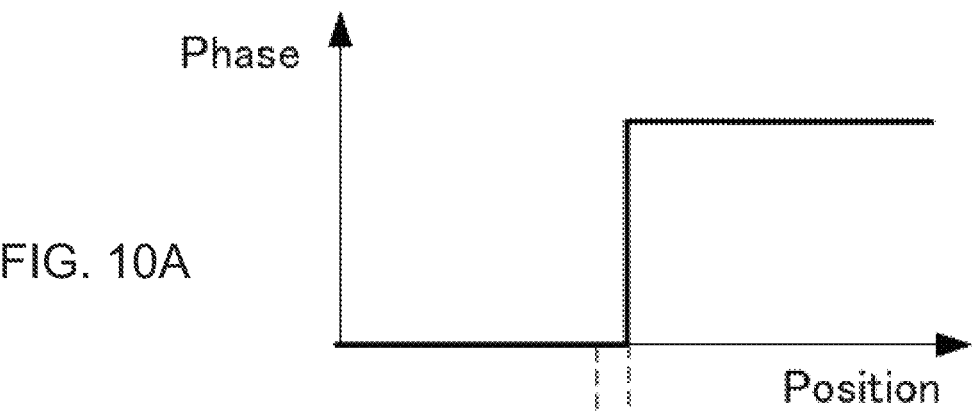
FIGS. 10A to 10C are graphical representations for describing the phase restoring method of the object beam according to the second embodiment.
Figure 10B:
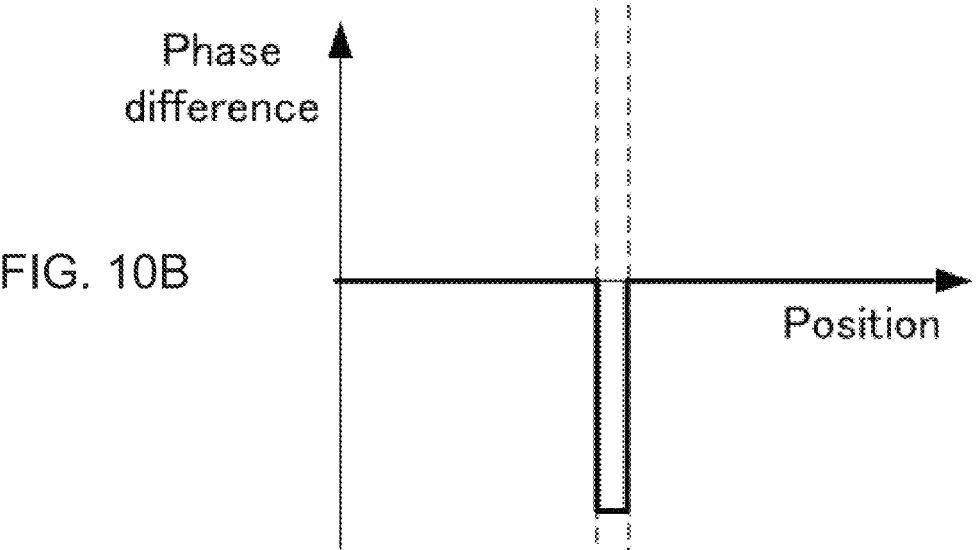
Figure 10C:
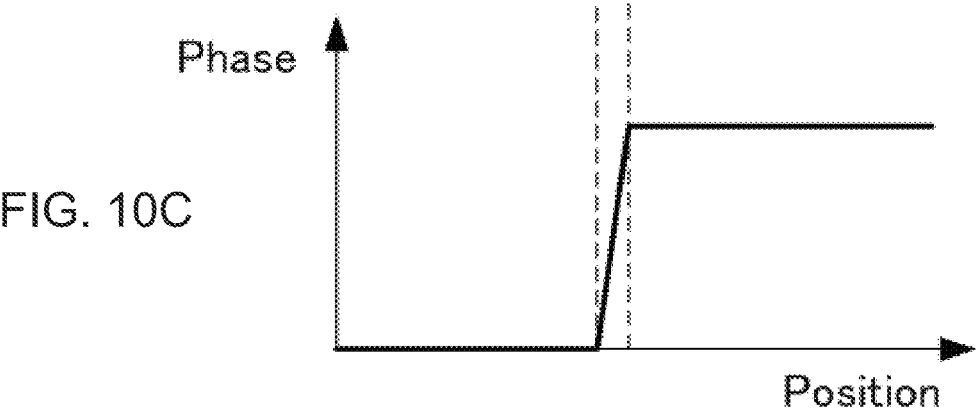

In the conventional method in FIG. 9A, the phase of a reference beam $\phi(x)$ with respect to the phase of an object beam $\theta(x)$ is detected (x=1, 2, 3, . . . , n). In this case, the phase of the reference beam $\phi(x)$ is preferably constant regardless of a measurement pixel. In an ideal detection method, the phase of the reference beam $\phi(x)$ can be considered to be constant. Accordingly, a DC offset of the phase is present in the conventional method, but the phase of the object beam can be directly detected. In contrast, the phase according to the present embodiment in FIG. 9B indicates the phase variation $\theta(x,T_1)-\theta(x,T_2)$ (x=1, 2, 3, . . . , n) during a predetermined time so that the phase of an object beam cannot be directly detected, differently from the conventional method. Therefore, an operation illustrated in FIG. 9C is performed in order to detect the phase of the object beam. A spatial phase variation of a measurement object is distinctively integrated in the phase restoration according to the present embodiment in FIG. 9C. For example, in a second pixel (a pixel 2), the phase of an adjacent pixel $\theta(1)$ and the phase variation $\Delta\theta(2)$ during the predetermined time are added so that a phase similar to that in the conventional method can be detected. Here, the measurement object is assumed to move by one pixel to the minus side during the predetermined time, in order to simplify the descriptions. Thus, the measurement object moves retaining the same phase state so that $\theta(1,T_1)$ and $\theta(2,T_2)$ have the same phase. Accordingly, those are canceled so that $\theta(2,T_1)-\theta(1,T_2)$ reamins. Similarly, the calculation is made for each pixel so that an n-th pixel can be expressed to be $\theta(n,T_1)-\theta(1,T_2)$. This can be considered to be the phase of the object beam $\theta(n,T_1)$ and the DC offset of the phase $\theta(1,T_2)$ so that a phase similar to that of the conventional method can be detected. FIGS. 10A to 10C illustrate an image of a phase detection result when a phase step is measured. FIGS. 10A, 10B, and 10C illustrate a phase of phase detection according to JP 8-189806 A, JP 5289383 B2, JP 3621994 B2, and JP 2005-283683 A (hereinafter, referred to as the conventional method), a phase according to the present embodiment (a phase variation during a predetermined time), and phase restoration according to the present embodiment, respectively.

The phase according to the present embodiment (a spatial phase variation) in FIG. 10B indicates a phase result different from that of the conventional method in FIG. 10A, but a phase similar to that of the conventional method can be acquired by performing the phase restoration as illustrated in FIG. 10C. Here, FIG. 10C illustrates a linear variation with respect to the step so that the variation seems not to perfectly agree with that of the conventional method in FIG. 10A. This is because movement over several pixels is considered in the present figure, whereas the measurement object is assumed to move by the one pixel during the predetermined time in the operation. The movement of the measurement object during the predetermined time is reduced or the measurement is performed at high speed so that the variation comes close to that of the conventional method. When the measurement object having a phase continuously varying, such as a sinusoidal wave, is measured, the phenomenon does not occur.

Figure 11A:
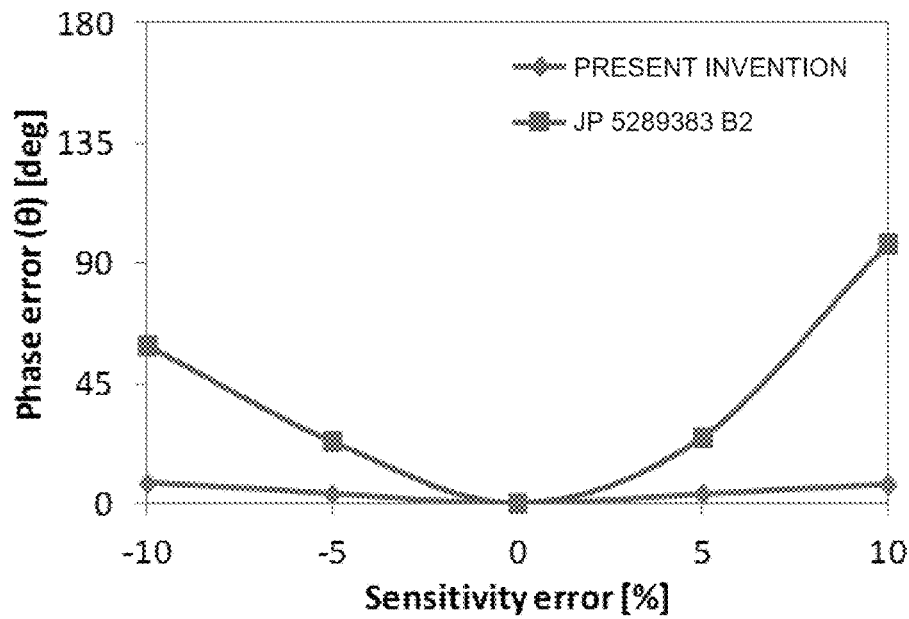
FIGS. 11A and 11B are graphical representations for describing an effect of the invention according to the second embodiment.
Figure 11B:
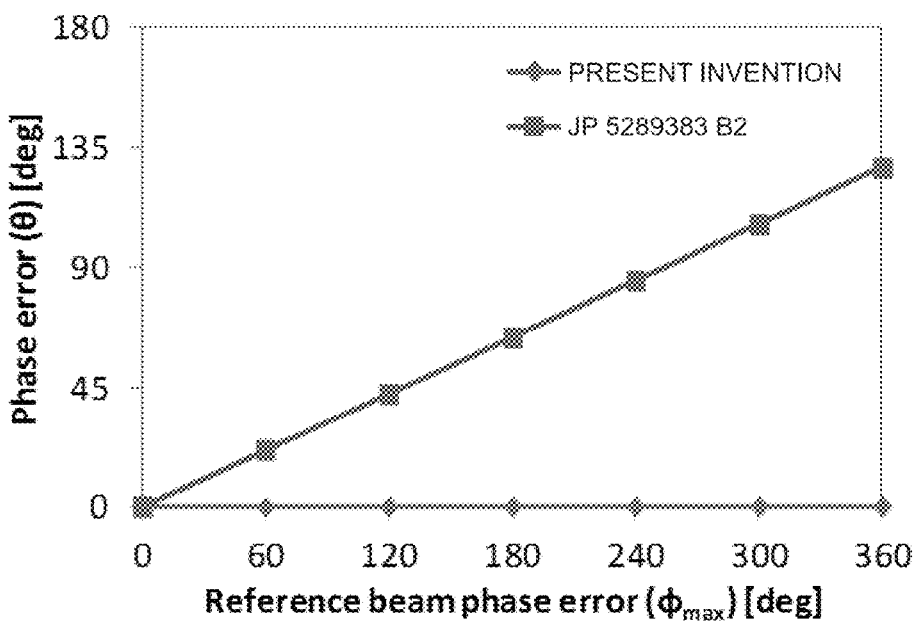

FIGS. 11A and 11B illustrate a calculation result of robustness. FIG. 11A illustrates dependency on detector sensitivity error, and FIG. 11B illustrates dependency on reference beam phase error. The present calculation uses the following conditions.

[Dependency on Detector Sensitivity Error]
Object beam phase: FIG. 4A
Reference beam phase: flat, FIG. 4B
Signal amplification factor: 50 times
Time shift amount: 1/18 of a cycle
Pixel count: 1000×1000 pixels
Pixel pitch: 8 μm
Phase error: average phase error in 104 μm (corresponding to 15 pixels)

[Dependency on Reference Beam Phase Error]
Object beam phase: FIG. 4A
Reference beam phase: FIG. 4B
Signal amplification factor: 50 times
Time shift amount: 1/18 of a cycle
Pixel count: 1000×1000 pixels
Pixel pitch: 8 μm
Phase error: average phase error in 104 μm (corresponding to 15 pixels)

Note that the phase of the object beam $\theta(x,y,t)$ is a sinusoidal wave. The sinusoidal wave is shifted by 1/18 of a cycle from time $T_1$ to time $T_2$. The dependency on detector sensitivity error illustrates a result of the phase error when the sensitivity of one detector varies. The horizontal axis of the dependency on reference beam phase error corresponds to a peak position in FIG. 4B. The phase of the object beam is considered to be the sinusoidal wave in an x direction and the phase of the reference beam is considered to be a sinusoidal wave in a y direction. Furthermore, a flaw or dust is assumed to be approximately 100 μm in size and an average phase error therein is calculated.

From the present result, it can be seen that the robustness according to the present embodiment is effective against the detector sensitivity error and the reference beam phase error, in comparison to the conventional method. Note that, in the present operation, the phase error increases as a detection range increases. Thus, a defect is previously detected on the side of the spatial phase variation and then the phase variation is acquired being limited in a predetermined region so that the phase error can be reduced.

As described above, the phase restoration according to the present embodiment is performed with the spatial phase variation of the measurement object according to the first embodiment so that a phase of the object beam similar to that of the conventional method can be produced. Furthermore, as the phase detection of the object beam in the predetermined region, phase detection can be performed with robustness more effective than that of the conventional method.

Third Embodiment

Figure 12:
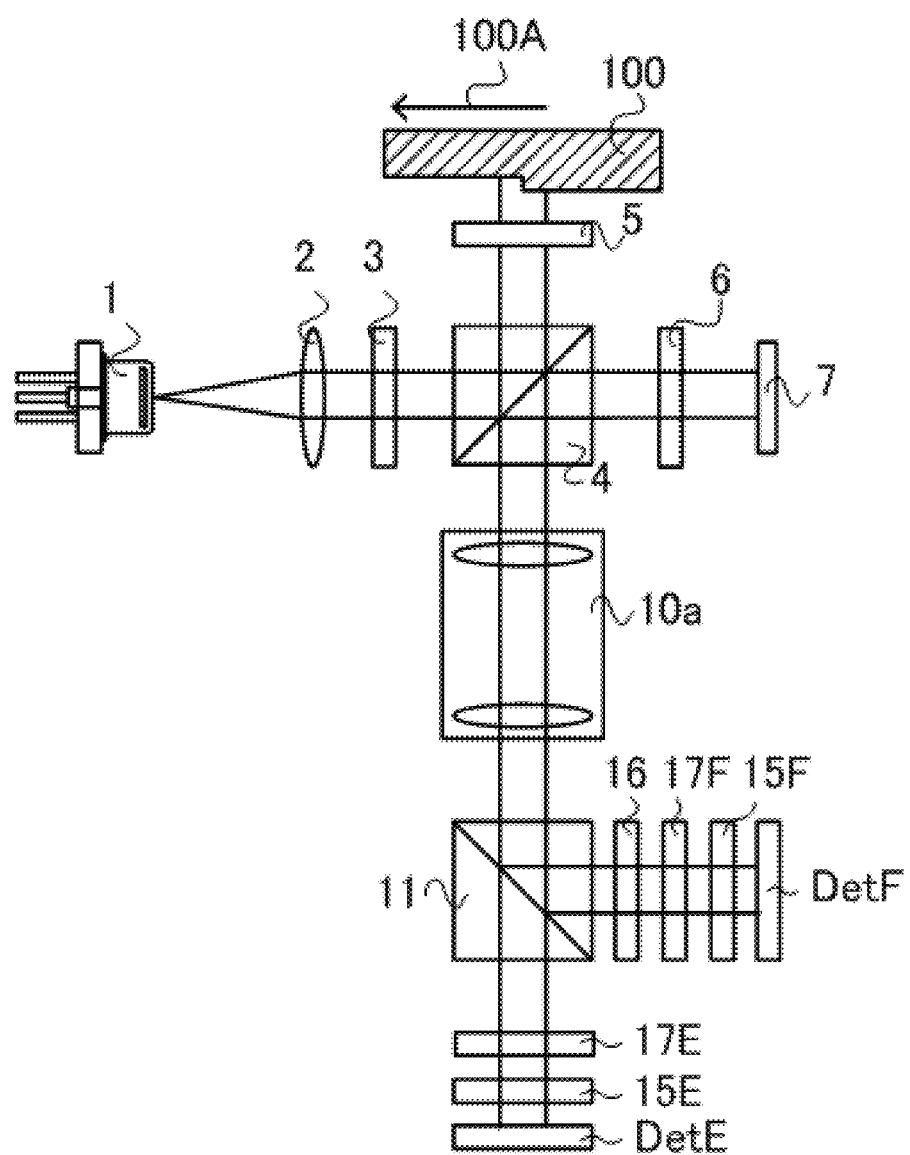
FIG. 12 is a view of an optical system of an interference measurement device according to a third embodiment.

FIG. 12 is an optical system configuration of an interference measurement device according to a third embodiment of the present invention. A phase detection method according to the present embodiment will be described with FIG. 12. Note that, optical components having functions similar to those according to the first embodiment, are denoted with the same reference numbers. The present embodiment is different from the first embodiment in terms of an optical system after a PBS 4, and thus differences between the present embodiment and the first embodiment will be described.

Figure 13A:
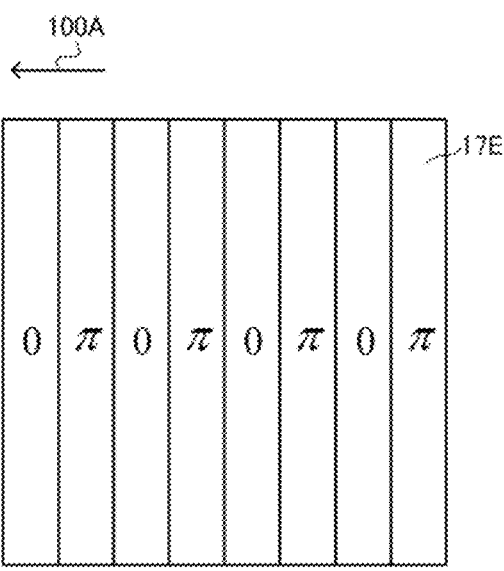
FIGS. 13A and 13B are diagrams for describing a division phase shift array element according to the third embodiment.
Figure 13B:
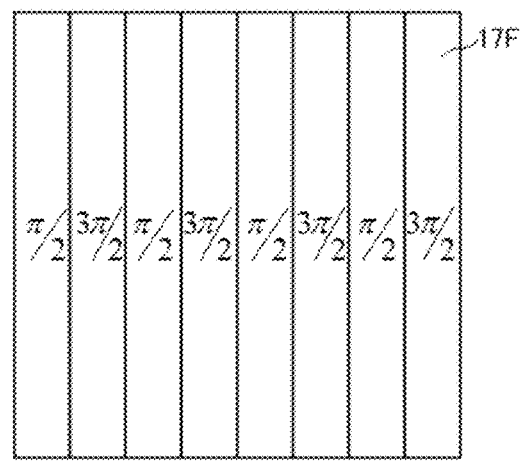

An object beam and a reference beam emitted from the PBS 4 are incident on the HBS 11 through a relay lens 10a. The relay lens 10a has two-fold magnification in a moving direction of a measurement object 100, and magnifies only an image of the measurement object 100 in a horizontal direction, two times so as to propagate the image to detectors DetE and DetF. The object beam and the reference beam that have passed through the HBS 11 are incident on the detector DetE through a division phase shift array element 17E and a polarizer 15E. The object beam and the reference beam that have reflected from the HBS 11 are incident on the detector DetF through the variable phase retarder 16, a division phase shift array element 17F, and a polarizer 15F. FIGS. 13A and 13B illustrate the division phase shift array elements. FIG. 13A illustrates the division phase shift array element 17E, and FIG. 13B illustrates the division phase shift array element 17F. Each division phase shift array element is divided into a plurality of regions in a direction similar to the moving direction 100A of the measurement object 100. The division phase shift array element 17E includes repetition of 0 deg and 180 deg ($\pi$), and the division phase shift array element 17F includes the repetition of 90 deg ($\pi/2$) and 270 deg ($3\pi/2$). A phase is added to any one of the object beam and the reference beam that have passed through each region. The division phase shift array elements each can be manufactured with a liquid crystal element or a photonic crystal.

In the configuration according to the present embodiment, an intensity signal that passes through the regions of 0 deg and is detected by the detector DetE is defined to be $I_A(x,y,t)$, and an intensity signal that passes through the regions of 180 deg ($\pi$) and is detected by the detector DetE is defined to be $I_B(x,y,t)$. An intensity signal that passes through the regions of 90 deg ($\pi/2$) and is detected by the detector DetF is defined to be $I_C(x,y,t)$, and an intensity signal that passes through the regions of 270 deg ($3\pi/2$) and is detected by the detector DetF is defined to be $I_D(x,y,t)$. Similarly to the first embodiment, $I_A(x,y,T_1)$, $I_B(x,y,T_2)$, $I_C(x,y,T_2)$, and $I_D(x,y,T_2)$ are $T_1$ with the added phase of the variable phase retarder 16 being 0 deg. $I_A(x,y,T_2)$, $I_B(x,y,T_2)$, $I_C(x,y,T_2)$, and $I_D(x,y,T_2)$ are detected at time $T_2$ with the added phase of the variable phase retarder 16 being 180 deg. The operation in Mathematical Formula 9 is performed with these signals so that a phase similar to that according to the first embodiment can be detected.

A similar division phase shift array element is used in JP 2005-283683 A, but a wavefront error of a reference beam and degradation of a phase image in resolving power, being a problem in JP 2005-283683 A, have been solved according to the present embodiment. The detection method according to the present embodiment is independent of a wavefront error of the optical system and a temperature gradient in an optical path of the reference beam, as described in the first embodiment.

The degradation of the phase image in resolving power has been solved by using a feature of the present detection method and the relay lens 10a. The present detection method distinctively moves the measurement object 100. Thus, the relay lens 10a according to the present embodiment magnifies the image two times. Accordingly, an image practically incident on the detectors DetE and DetF so as to be detected is only half of the original image. Note that, the measurement object 100 moves in the present detection method so that the remaining half may be detected after the movement. In this manner, the degradation of the resolving power can be prevented. The division phase shift array elements 17E and 17F need to be divided into the plurality of regions in the moving direction 100A of the measurement object 100 for the prevention.

According to the present embodiment, streamlining has been made to the first embodiment so that miniaturization and cost reduction can be advantageously made to the optical system. Note that, the variable phase retarder 16 has been used according to the present embodiment, but the variable phase retarder 16 can be omitted. For example, at time $T_1$, a signal that passes through the regions of 0 deg and is detected by the detector DetE is defined to be $I_A(x,y,T_1)$, and a signal that passes through the regions of 180 deg ($\pi$) and is detected by the detector DetE is defined to be $I_B(x,y,T_1)$. A signal that passes through the regions of 90 deg ($\pi/2$) and is detected by the detector DetF is defined to be $I_C(x,y,T_1)$, and a signal that passes through the regions of 270 deg ($3\pi/2$) and is detected by the detector DetF is defined to be $I_D(x,y,T_1)$. At time $T_2$, a signal that passes through the regions of 0 deg and is detected by the detector DetE is defined to be $I_A(x,y,T_2)$, and a signal that passes through the regions of 180 deg ($\pi$) and is detected by the detector DetE is defined to be $I_B(x,y,T_2)$. A signal that passes through the regions of 90 deg ($\pi/2$) and is detected by the detector DetF is defined to be $I_D(x,y,T_2)$, and a signal that passes through the regions of 270 deg ($3\pi/2$) and is detected by the detector DetF is defined to be $I_C(x,y,T_2)$. The signals detected by the detector DetF at time $T_2$ are replaced so that a phase similar to that according to the first embodiment can be detected with Mathematical Formula 9. The method needs the different detectors that perform the differential operation in the first embodiment so that improvement of the robustness being a feature of the embodiment of the present invention cannot be made. However, according to the present embodiment, when the detection is made from adjacent pixels, influence due to variability of an optical element, a variation in sensitivity of a detector, dust, or a stain, is barely received. Accordingly, according to the present embodiment, the variable phase retarder 16 can be omitted.

Note that, according to the present embodiment, the division phase shift array elements that have been used are transmissive, but may be a reflective phase element or liquid crystal element, having a stepped shape.

Fourth Embodiment

Figure 14:
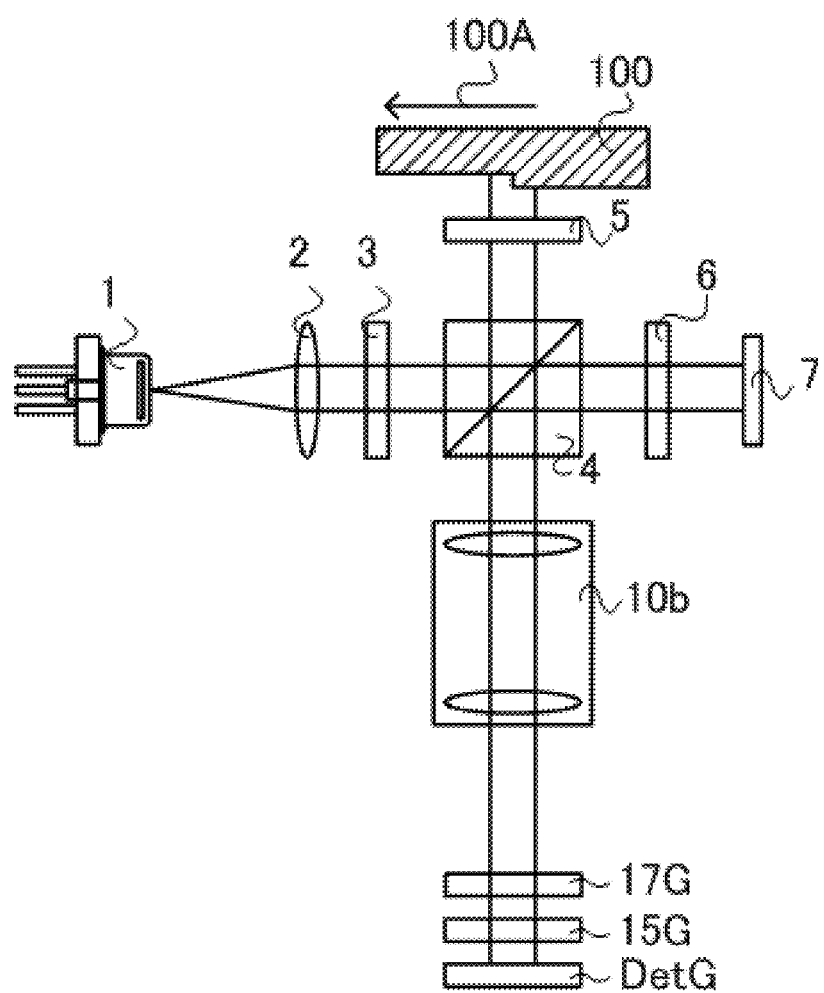
FIG. 14 is a view of an optical system of an interference measurement device according to a fourth embodiment.

FIG. 14 is an optical system configuration of an interference measurement device according to a fourth embodiment of the present invention. A phase detection method according to the present embodiment will be described with FIG. 14. Note that, optical components having functions similar to those according to the first embodiment, are denoted with the same reference numbers. The present embodiment is different from the first embodiment in terms of an optical system after a PBS 4, and thus differences between the present embodiment and the first embodiment will be described.

Figure 15:
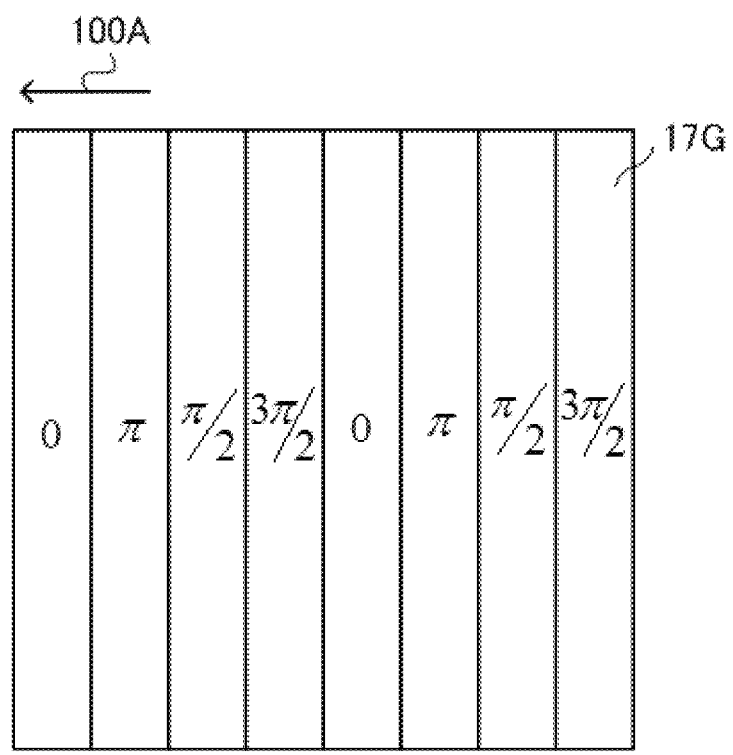
FIG. 15 is a diagram for describing a division phase shift array element according to the fourth embodiment.

An object beam and a reference beam emitted from the PBS 4 are incident on a detector DetG through a relay lens 10b, a division phase shift array element 17G, and a polarizer 15G. The relay lens 10b has four-fold magnification in a moving direction of a measurement object 100, and magnifies only an image of the measurement object 100 in a horizontal direction, four times so as to propagate the image to the photodetector. FIG. 15 illustrates the division phase shift array element 17G. The division phase shift array element 17G is divided into a plurality of regions in a direction similar to the moving direction 100A of the measurement object 100, and includes repetition of 0 deg, 180 deg ($\pi$), 90 deg ($\pi/2$), and 270 deg ($3\pi/2$). A phase is added to any one of the object beam and the reference beam that have passed through each region.

In the configuration according to the present embodiment, at time $T_1$, an intensity signal that passes through the regions of 0 deg and is detected by the detector DetG is defined to be $I_A(x,y,T_1)$, and an intensity signal that passes through the regions of 180 deg ($\pi$) and is detected by the detector DetG is defined to be $I_B(x,y,T_1)$. An intensity signal that passes through the regions of 90 deg ($\pi/2$) and is detected by the detector DetG is defined to be $I_C(x,y,T_1)$, and an intensity signal that passes through the regions of 270 deg ($3\pi/2$) and is detected by the detector DetG is defined to be $I_D(x,y,T_1)$. At time $T_2$, an intensity signal that passes through the regions of 0 deg and is detected by the detector DetG is defined to be $I_A(x,y,T_2)$, and an intensity signal that passes through the regions of 180 deg ($\pi$) and is detected by the detector DetG is defined to be $I_B(x,y,T_2)$. An intensity signal that passes through the regions of 90 deg ($\pi/2$) and is detected by the detector DetG is defined to be $I_D(x,y,T_2)$ and an intensity signal that passes through the regions of 270 deg ($3\pi/2$) and is detected by the detector DetG is defined to be $I_C(x,y,T_2)$. In this manner, a phase signal similar to that according to the first embodiment can be detected with Mathematical Formula 9. When the detection is made from adjacent pixels, a signal intensity error due to a sensitivity error between pixels, dust, or a stain, is small so that the level of a phase error generated thereby is small.

According to the present embodiment, the two problems in JP 2005-283683 A have been solved, similarly to the third embodiment. The relay lens 10b according to the present embodiment magnifies the image four times, and thus four times of the measurement are performed so that the same resolving power can be achieved. According to the present embodiment, streamlining has been made to the first embodiment so that miniaturization and cost reduction can be advantageously made to the optical system.

With the configuration according to the present embodiment, a phase operation can be also spatially made with a measurement object fixed although the detection pixel count decreases. For example, image signals of predetermined four pixels are defined to be $I_A(x,y,T_1)$, $I_B(x,y,T_1)$, $I_C(x,y,T_1)$, and $I_D(x,y,T_1)$, and image signals of adjacent four pixels are defined to be $I_A(x,y,T_2)$, $I_B(x,y,T_2)$, $I_C(x,y,T_2)$, and $I_D(x,y,T_2)$. Then, an operation is made with Mathematical Formula 9 so that a spatial phase variation can be acquired. This means that performance similar to the movement of the object, is made on the side of the detector. Phase detection having robustness more effective than that in JP 2005-283683 A, can be performed even on this condition. The present detection method is effective when ununiformity in a face, such as the intensity ununiformity of the reference beam or the intensity ununiformity of the detector, is small with respect to the signal intensity. For example, the detection method is effective for a measurement object having a large phase variation.

Note that, the present invention is not limited to the above embodiments, and includes various modifications. For example, the embodiments have been described in detail in order to simply describe the present invention, and the invention is not necessarily limited to including all the configurations that have been described. A configuration in an embodiment may be partially replaced with a configuration in a different embodiment, and a configuration in an embodiment may be added with a configuration in a different embodiment. Addition, deletion, and replacement with a different configuration may be made to a partial configuration of each embodiment.

What is claimed is:

1. An interference measurement device configured to detect a phase from an interference beam between an object beam and a reference beam, the interference measurement device comprising:
    a laser beam source;
    one or more beam splitters configured to split an emitted beam from the laser beam source into the object beam which is incident on a measurement object and the reference beam and to combine the object beam from the measurement object with the reference beam to make the interference beam;
    a plurality of beam splitters configured to split the interference beam into a plurality of interference beams;
    a plurality of detectors configured to detect the plurality of interference beams received from the plurality of beam splitters at time T1 and at time T2 which follows T1; and
    a variable phase retarder disposed in an optical path of half of the interference beams split by the plurality of beam splitters and configured to shift a phase of the half of the interference beams which are incident on half of the plurality of detectors, by approximately $(n+1)\pi$, the n being 0 or a positive integer, wherein the phase shift varies between a first phase at time T1 and a second phase at time T2.

2. The interference measurement device according to claim 1,
    wherein the measurement object or the interference measurement device moves in order to detect the spatial phase variation of the object beam.

3. The interference measurement device according to claim 1, wherein the one or more beam splitters combine the object beam incident on and reflected from the measurement object with the reference beam to make the interference beam.

4. The interference measurement device according to claim 1, wherein the one or more beam splitters combine the object beam incident and which passes through the measurement object with the reference beam to make the interference beam.

5. The interference measurement device according to claim 1, further comprising:
means for directly calculating a signal of a spatial phase variation of the object beam based on respective differentials in intensity signals detected by each of the plurality of detectors at times T1 and T2.

6. The interference measurement device according to claim 5, wherein the plurality of detectors include a first detector, a second detector, a third detector, and a fourth detector,
wherein the half of the interference beams are incident of the third detector and the fourth detector,
wherein the signal of the spatial phase variation is directly calculated according to:

$$\Delta\theta(x, y, T_1) = 2\tan^{-1}\left[\pm\sqrt{\frac{\{I_A(x, y, T_1) - I_A(x, y, T_2)\}^2 + \{I_B(x, y, T_1) - I_B(x, y, T_2)\}^2}{\{I_C(x, y, T_1) - I_C(x, y, T_2)\}^2 + \{I_D(x, y, T_1) - I_D(x, y, T_2)\}^2}}\right]$$

where $\Delta\theta(x, y, T1)$ is the spatial phase variation, $I_A$ is an intensity signal detected by the first detector, $I_B$ is an intensity signal detected by the second detector, $I_C$ is an intensity signal detected by the third detector, and ID is an intensity signal detected by the fourth detector.

7. An interference measurement device configured to detect a phase from interference beams, the interference measurement device comprising:
a laser beam source;
a plurality of first beam splitters configured to split an emitted beam from the laser beam source into an object beam which is incident on a measurement object and a reference beam, to split the object beam from the measurement object into a first object beam and a second object beam, and to split the reference beam into a first reference beam and a second reference beam;
a plurality of second beam splitters configured to combine the first object beam with the first reference beam and to combine the second object beam with the second reference beam to make a plurality of first interference beams;
a plurality of third beam splitters configured to split the plurality of first interference beams into a plurality of second interference beams;
a plurality of detectors configured to detect the plurality of second interference beams at time T1 and time T2 which follows T1; and
a variable phase retarder disposed in an optical path of half of the plurality of first interference beams and configured to shift a phase of the half of the first interference beams by approximately (n+1)π, the n being 0 or a positive integer, wherein the phase shift varies between a first phase at time T1 and a second phase at time T2.

8. The interference measurement device according to claim 7, further comprising:
means for directly calculating a signal of a spatial phase variation of the object beam based on respective differentials in intensity signals detected by each of the plurality of detectors at times T1 and T2.

9. The interference measurement device according to claim 8, wherein the plurality of detectors include a first detector, a second detector, a third detector, and a fourth detector,
wherein the half of the first interference beams incident on the variable phase retarder are split into the second interference beams incident only on the third detector and the fourth detector,
wherein the signal of the spatial phase variation is directly calculated according to:

$$\Delta\theta(x, y, T_1) = 2\tan^{-1}\left[\pm\sqrt{\frac{\{I_A(x, y, T_1) - I_A(x, y, T_2)\}^2 + \{I_B(x, y, T_1) - I_B(x, y, T_2)\}^2}{\{I_C(x, y, T_1) - I_C(x, y, T_2)\}^2 + \{I_D(x, y, T_1) - I_D(x, y, T_2)\}^2}}\right]$$

where $\Delta\theta(x, y, T1)$ is the spatial phase variation, $I_A$ is an intensity signal detected by the first detector, $I_B$ is an intensity signal detected by the second detector, $I_C$ is an intensity signal detected by the third detector, and ID is an intensity signal detected by the fourth detector.

* * * * *